(12) United States Patent
Dubinsky et al.

(10) Patent No.: US 9,292,480 B2
(45) Date of Patent: Mar. 22, 2016

(54) METHOD FOR DISPLAYING AND PRINTING DIFFERENT SIZES OF SMART DOCS

(75) Inventors: Andrew M. Dubinsky, Houston, TX (US); Wesley A. Thomas, Pearland, TX (US); Ilya Andreyev, Houston, TX (US)

(73) Assignee: Encomia, L.P., Houston, TX (US)

( * ) Notice: Subject to any disclaimer, the term of this patent is extended or adjusted under 35 U.S.C. 154(b) by 1117 days.

(21) Appl. No.: 11/482,133

(22) Filed: Jul. 6, 2006

(65) Prior Publication Data

US 2007/0011457 A1 Jan. 11, 2007

Related U.S. Application Data

(60) Provisional application No. 60/696,852, filed on Jul. 6, 2005.

(51) Int. Cl.
- *G06F 17/24* (2006.01)
- *G06F 17/22* (2006.01)
- *G06F 17/21* (2006.01)
- *G06F 17/25* (2006.01)

(52) U.S. Cl.
CPC .......... *G06F 17/2247* (2013.01); *G06F 17/212* (2013.01)

(58) Field of Classification Search
CPC ...................................... G06F 17/60
USPC ....................................... 715/273
See application file for complete search history.

(56) References Cited

U.S. PATENT DOCUMENTS

| | | | |
|---|---|---|---|
| 6,446,115 B2 * | 9/2002 | Powers | 709/206 |
| 7,568,101 B1 * | 7/2009 | Catorcini et al. | 713/176 |
| 8,064,073 B2 * | 11/2011 | Sprague et al. | 358/1.13 |
| 2002/0097418 A1 * | 7/2002 | Chang et al. | 358/1.13 |
| 2002/0184305 A1 * | 12/2002 | Simpson et al. | 709/203 |
| 2004/0221162 A1 * | 11/2004 | Kongtcheu | 713/178 |
| 2005/0102235 A1 * | 5/2005 | Waidner | 705/51 |
| 2005/0151986 A1 * | 7/2005 | Hisatomi et al. | 358/1.13 |
| 2005/0177389 A1 * | 8/2005 | Rakowicz et al. | 705/1 |
| 2005/0183142 A1 * | 8/2005 | Podanoffsky | 726/18 |
| 2006/0259440 A1 * | 11/2006 | Leake et al. | 705/76 |
| 2007/0005978 A1 * | 1/2007 | O'Connor et al. | 713/176 |

OTHER PUBLICATIONS

Bolin et al.,"Automation and Customization of Rendered Web Pages", ACM, 2005, pp. 163-172.*
Song, Dawn,"Practical Forward Secure Group Signature Schemes", ACM, 2001, pp. 225-234.*
Pinkas et al.,"Electronic Signature Formats for Long Term Electronic Signatures", RFC Editor, 2001, pp. 1-83.*
Meneguzzi et al., "Strategies for Document Optimization in Digital Publishing", ACM, 2004, pp. 163-170.*
Aashish Srivastava, "Electronic Signature: A brief review of the Litereature", ACM, 2006, pp. 605-609.*

* cited by examiner

*Primary Examiner* — James J Debrow
(74) *Attorney, Agent, or Firm* — Bell Nunnally & Martin LLP; Craig J. Cox

(57) ABSTRACT

The present invention uses XHTML and XML to output a varied resolution PNG (Portable Network Graphics) representation of a document. The resulting image file is too large to be displayed on a standard computer monitor without forcing the user to scroll the document horizontally and/or vertically. The present invention manually rasterizes the image to an acceptable resolution for viewing on a standard computer monitor and allows the user to electronically sign the presented SMART Doc.

20 Claims, 2 Drawing Sheets

PrintToSMARTDoc process flow

*SMARTDoc Hierarchy*

*PrintToSmartDoc Process*

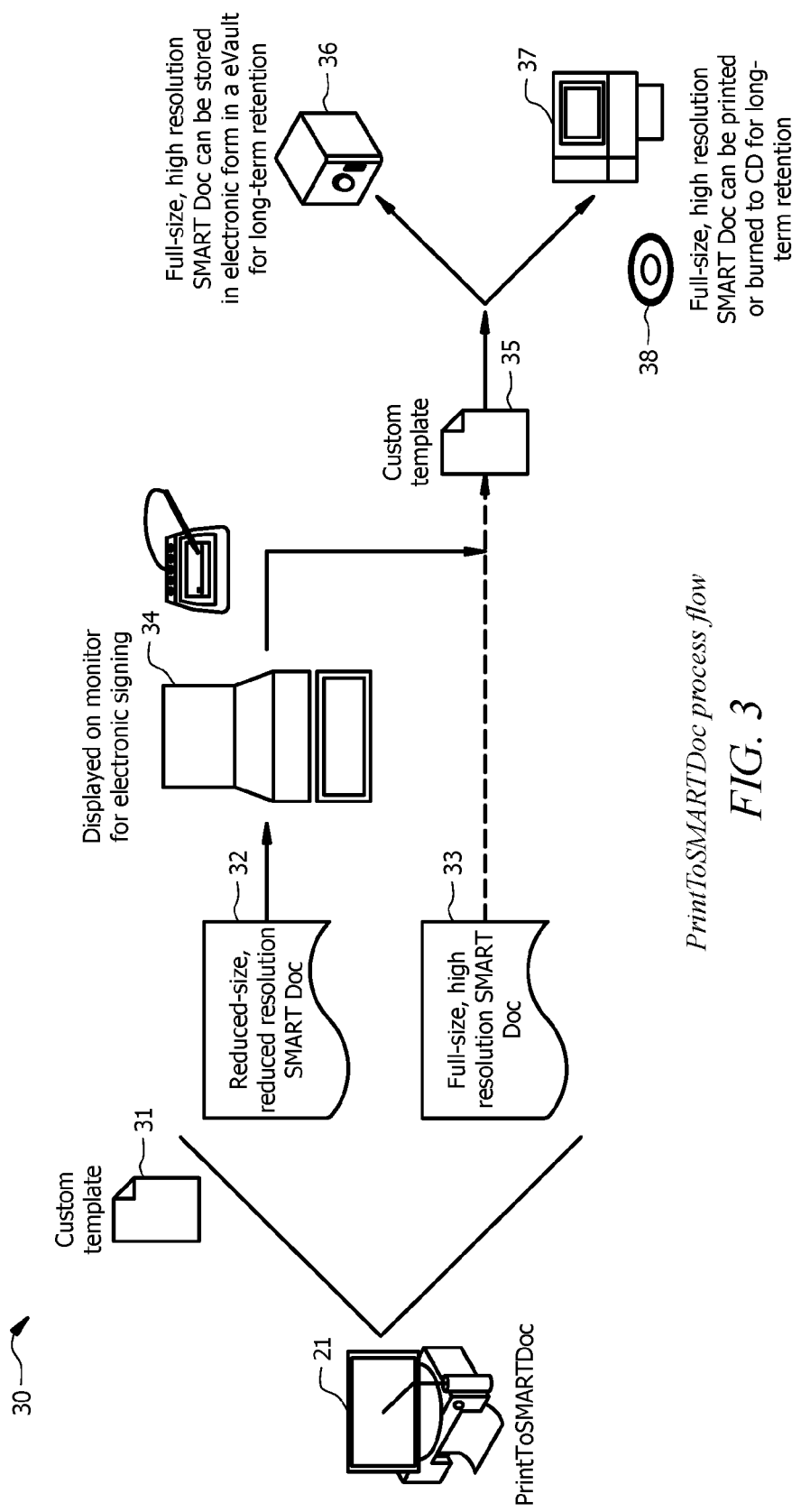

METHOD FOR DISPLAYING AND PRINTING DIFFERENT SIZES OF SMART DOCS

CROSS-REFERENCE TO RELATED APPLICATIONS

This application claims priority to U.S. Provisional Application No. 60/696,852, filed Jul. 6, 2005, which is incorporated by references herein in its entirety.

TECHNICAL FIELD

The present invention relates generally to interfaces in computer systems and more particularly to the a system and method to display of SMART Docs within a software application and the print the same SMART Doc to any standard printer.

BACKGROUND OF THE INVENTION

SMART Docs are electronic documents that use XML programming code to create multi-layer documents in which static, non-changing text can be carried in one layer, with variable document-specific data overlaid in a second layer. This achieves the effect of keeping the electronic document itself separate from the variable data and makes it possible to extract the variable data from the electronic document for use in other electronic documents or for storage to a database.

SMART Docs are easy to generate and display, but the largest barrier to wide-scale industry implementation of SMART Docs in the financial and mortgage sectors has been the inability to effectively and correctly display and print SMART Docs. Generated SMART Docs can be made to look perfect on a standard computer monitor, but cannot be printed correctly because of resolution and sizing issues.

A further understanding of the nature and advantages of the inventions herein may be realized by reference to the remaining portions of the specification and the attached drawings.

BRIEF SUMMARY OF THE INVENTION

The present invention uses XHTML and XML to output a varied resolution (such as, for example, 300 dpi, 600 dpi, or 1200 dpi) PNG (Portable Network Graphics) representation of a document. The resulting image file is too large to be displayed on a standard computer monitor without forcing the user to scroll the document horizontally and/or vertically. The present invention manually rasterizes the image to an acceptable resolution for viewing on a standard computer monitor and allows the user to electronically sign the presented SMART Doc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 is a diagram of an embodiment of a process flow illustrating the conversion of a document to a SMART Doc that can be printed or viewed on a computer monitor.

DETAILED DESCRIPTION OF THE INVENTION

In a preferred embodiment of the present invention, the concepts described herein operate as a software program on a computer. According to a preferred embodiment, the program is operable to convert any document or file made by any computer program, such as a Microsoft® Windows® based program, to a document which contains fixed and/or variable information and can be both displayed and printed while retaining the relationship between the variable and fixed information. An example of such a document is a Mortgage Industry Standards Maintenance Organization ("MISMO")-compliant Category 1 SMART Doc.

Embodiments of the present invention also allow electronic signing of the resulting document, such as a MISMO-compliant Category 1 SMART Doc, using signature pads or other electronic signing methods.

As used herein the terms document and electronic document are used interchangeably and refer to the electronic representation of a document by a computer system. An example of an electronic document is a SMART Doc, which is an extensible markup language ("XML")-based construct where "layers" are used to separate static, unchangeable text from variable document-specific data. SMART Docs have application in legal documentation, such as mortgage documents, where there is legal verbiage that is consistent across all similar documents and variable information which needs to added to the document to conform to the specific transaction.

There are five (5) categories, or "types" of SMART Docs as defined by MISMO. SMART Docs are not fully compliant with the MISMO standard unless they conform to and meet all requirements for Category 1 SMART Docs. Category 2 through 5 SMART Docs, while valid SMART Docs, are not fully compliant with the MISMO standard.

In addition to single documents, documents may be associated with other documents in a form referred to as an ePackage. An ePackage is an electronic container file for other electronic files. For example, MISMO has an ePackage format that allows electronic files to be bundled into ePackages for easier transport between actors in the transaction and easier long-term storage of the electronic file package associated with a mortgage loan.

Figure 1:
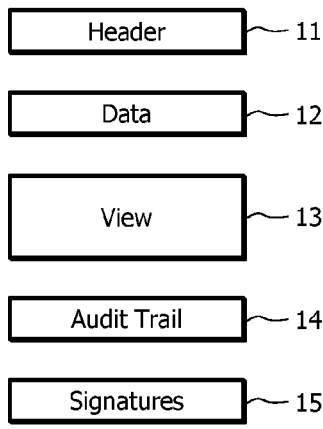
FIG. 1 is a block diagram showing an example of a hierarchy in a SMART Doc.

As shown in FIG. 1, SMART Docs, or SMART documents, are multi-layer XML-based electronic documents that are generally used as executable (signable) documents and are divided into five (5) sections. First, a HEADER section 11 contains general information about the SMART Doc itself, such as type, TDT, and style sheet references. Second, a DATA section 12 contains document-specific variable data elements, for example, name, address, telephone number, etc. Third, a VIEW section 13 is the viewable template-based section of the document that has the variable data from the DATA section 12 inserted into the correct locations. Fourth, an AUDIT TRAIL section 14 contains log information about the SMART Doc, such as who signed the document and when, and is viewable by the user. The fifth section is a SIGNATURES section 15 contains the electronic images of any signatures that have been applied to the document.

As stated, there are five (5) categories, or "types" of SMART Docs as defined by MISMO. To be fully compliant with the MISMO standards SMART Docs should conform to and meet the requirements for Category 1 SMART Docs. Category 2 through 5 SMART Docs, while valid SMART Docs, may not be fully compliant with the MISMO standard.

| | |
|---|---|
| Category 1 | The HEADER section is fully implemented and the DATA section is complete. VIEW is in XHMTL format. ARCs are implemented for each data point element in the VIEW, and the SIGNATURE section is in place and includes a digital signature for tamper-sealing the document. |
| Category 2 | The HEADER section is fully implemented, but there are no DATA or MAP sections. DATA are parsed from a Category 2 SMART Doc. VIEW is in XHTML format, and the SIGNATURE section is in place and includes a digital signature for tamper-sealing the document. |
| Category 3 | The HEADER section is fully implemented, but there is no VIEW section. All DATA is included, but because there are no tags and no VIEW, this type of SMART Doc is little more than a data holder. A SIGNATURE section is included and includes a digital signature for tamper-sealing the document. |
| Category 4 | The HEADER section is fully implemented, but there is no DATA section. A non-tagged VIEW section allows some information to be read, but data-sharing is limited. SIGNATURES section is included in an external file. |
| Category 5 | The HEADER section is fully implemented, but there is no VIEW section. The DATA section does not include a MAP section, making this type of SMART Doc little more than a data holder. A SIGNATURE section contains only a digital signature for tamper-sealing the document. |

As described, there can be discrepancies between what a user sees, or the word processing program displays, on the screen when a SMART Doc is being created or edited and what ultimately shows up on paper when the SMARTDoc is printed. The concepts described herein describe a system and method for ensuring that the printed documents matches the document displayed on the user's screen by the word processing program. The functionality, referred to as PrintToSMARTDoc, is implemented in an environment, such as the lender or title company environment, as a program or utility running on a user's computer in conjunction with the user's word processing program or other application. PrintToSMARTDoc can print any document from any application, such as Microsoft® Windows® based applications, to valid document format in accordance with the concepts described herein, An example of such a format would be a MISMO-compliant SMART Doc format.

Embodiments of the application, such as PrintToSMART-Doc, are used to convert documents from proprietary third-party document provider's document applications to a SMART Doc format. In a preferred embodiment, the application is configured to run under the Print button of the document application. After pressing the Print button in the application, the user may select the PrintToSMARTDoc function which calls the PrintToSMARTDoc application.

Embodiments of the application output a varied resolution (300 dpi, 600 dpi, or 1200 dpi) Portable Network Graphics ("PNG") representation of the document to be converted to a SMART Doc. The PNG format was developed as a response to the copyright and patent issues associated with the previously used GIF format. The PNG format has alpha channels, which allow for variable transparency in the image, gamma correction to control image brightness across any platform, and two-dimensional interlacing for progressive display of the image. PNG also has better compression characteristics, resulting in smaller image file sizes. PNG is "lossless" and supports 48-bit truecolor and 16-bit grayscale, resulting in better quality images that don't degrade over time or with repeated opening or closing of the image file. The PNG output of the application yields an image file that is too large to display on a standard computer screen (i.e. is non-scalable) without forcing the user to scroll horizontally and/or vertically.

Embodiments of the present application overcome this display problem by manually rasterizing and resizing the PNG image file to a resolution that can be easily viewed on a standard computer monitor without scrolling. Rasterization the process by which code that describes a text or graphic is converted into a format recognized by a printer driver (a "print engine"), which then converts that code to a physical graphical representation of the image on a page. The application uses a print driver to transform any document from its native format to a valid MISMO-compliant Category 1 SMART Doc in PNG format, yielding a smaller-size file that does not suffer from degraded quality over time.

Figure 2:
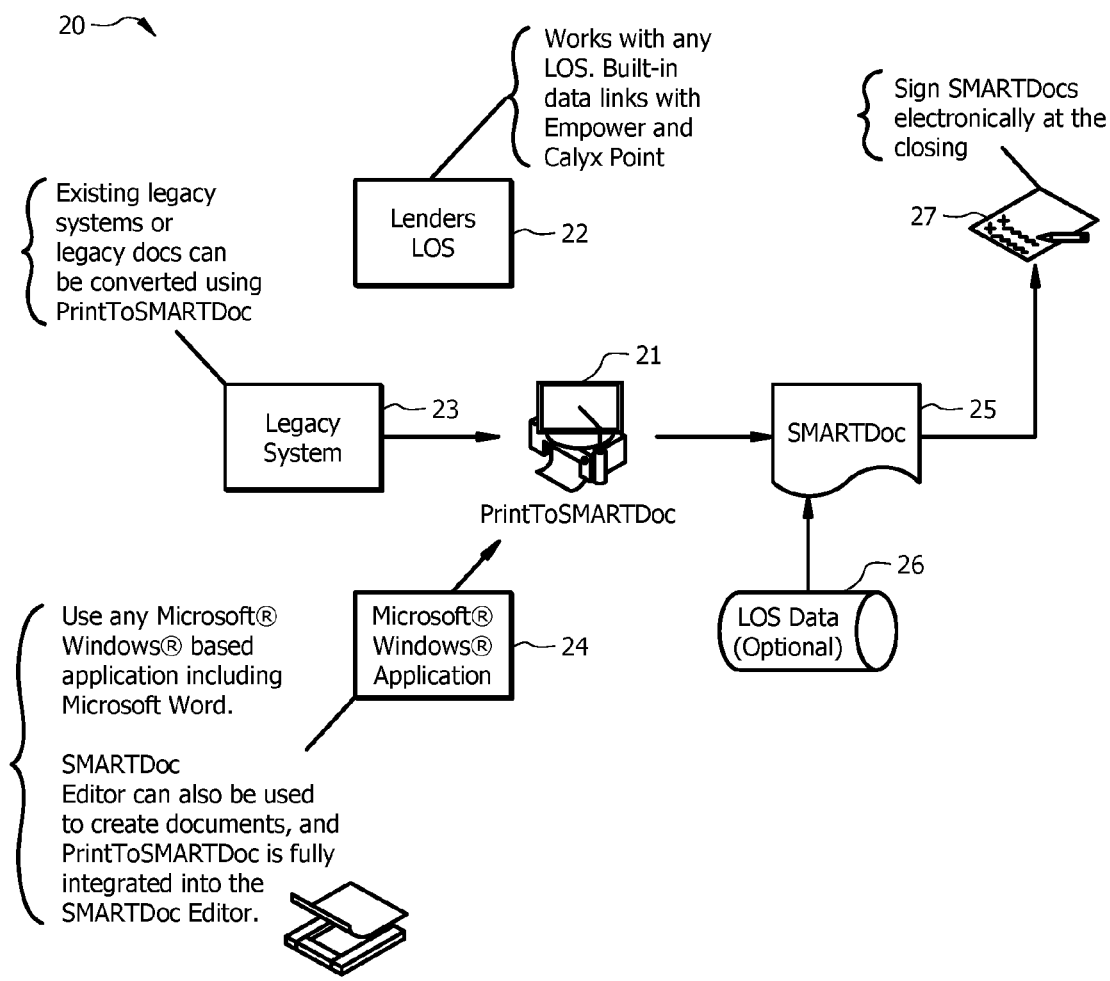
FIG. 2 is a diagram of an embodiment of a process for converting documents into a SMART Doc format.

As shown in FIG. 2, any source document can be converted by an embodiment of the present application, such as the PrintToSMARTDoc application, into a Category 1 MISMO-compliant SMART Doc, and then signed electronically, with or without variable data. According to a preferred embodiment, process 20 shows application 21 being used to convert documents into a SMART Doc format 25 which may then be electronically signed as shown in process 27. Any type of document may be converted by application 21. As described, application 21 will convert documents from word processing applications 24 such as Microsoft Word, and will also convert documents from legacy systems 23. Application 21 can also work directly with a lenders loan origination system ("LOS") to generate a SMART Doc with the information in that system. When working with a lenders LOS system, SMART Doc 25 can also be linked to the LOS database 26 in order to provide SMART Doc 25 with any variable or fixed information that may be required from the LOS.

Referring now to FIG. 3, an embodiment of the conversion process is shown. As shown in FIG. 3, present application 21 can be used to convert the source document into two (2) formats: a reduced-resolution PNG image 32 that can be viewed on a standard computer monitor 34, and a full-size high-resolution PNG image 33 suitable for printing. The reduced-resolution smaller PNG image can be displayed on a standard computer monitor 34 for electronic signing by individuals involved in the transaction.

Electronic signatures can then be populated to the full-size high-resolution PNG image 33 and scaled properly to ensure readability. The full-size high-resolution PNG image 33 with signatures can then be printed on a traditional ink printer 37 or burned to a CD or DVD 38 for long-term storage. PNG image files do not suffer from degraded quality over time, and offer a number of unique characteristics, including color-retention and better initial image quality and full-rasterization (all pixels in the image are resized equally, rather than being resized en masse), resulting in higher-quality images and the ability to repeatedly resize the image as needed without degrading readability or viewability.

As shown in FIG. 3, documents can be converted to SMART Doc format using a special print template 31 with a print driver as a reduced-size, reduced-resolution SMART Doc and a full-size, high-resolution SMART Doc. The special print template 31 may then be used to display the reduced-size, reduced-resolution SMART Doc on a standard computer monitor for electronic signing. The signed document is then passed back and swapped with the full-size high-resolution image, and can then be either printed or read to CD or stored in an eVault 36 as part of an ePackage. A print template 35 can also be used for the full-size image which is used to print, store or archive the converted SMART Doc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of displaying for a user a representation of a executable document formatted for printing, the method comprising:
    transforming a document into a print representation in a non-scalable graphic image format having a first resolution;
    rasterizing the print representation to create a display representation in the non-scalable graphic image format having a second resolution;
    displaying the display representation to the user for signing;
    capturing an electronic signature on the display representation;
    scaling the captured electronic signature to match the first resolution of the print representation;
    populating the electronic signature to the print representation; and
    printing the print representation, the print representation matching the format of the display representation, including the electronic signature, displayed to the user.

2. The method of claim 1 wherein the non-scalable graphic image format is a Portable Network Graphics representation of the document.

3. The method of claim 1 wherein the document is a word processing document.

4. The method of claim 1 wherein the document is a legacy system document.

5. The method of claim 1 wherein the document is generated by a loan origination system.

6. The method of claim 1 wherein the document is a layered XML document.

7. The method of claim 6 wherein the layered XML document is a SMART Doc.

8. The method of claim 7 wherein the SMART Doc is MISMO compliant.

9. The method of claim 1 further comprising multiple documents bundled together to form an ePackage.

10. A system for creating executable electronic documents, the electronic documents able to be printed in a format that matches the format seen by a user on a computer monitor, the system comprising:
    a driver running on a computer to transform a document into a non-scalable first graphic representations of the document, the non-scalable first graphic representation capable of being printed;
    the non-scalable first graphic representation being rasterized to create a second graphic representation in the same image format as the non-scalable first graphic representation, the second graphic representation sized to display on the user's computer monitor and capable of being electronically signed by an electronic signature application; and
    wherein the electronic signature from the second graphic representation is scaled to match resolution of the first graphic representation and then populated to the non-scalable first graphic representation thereby allowing the first graphic representation to be printed with the electronic signature.

11. The system of claim 10 wherein the driver is a print driver.

12. The system of claim 10 wherein the non-scalable first graphic representation and the second graphic representation use a Portable Network Graphics graphic image format.

13. The system of claim 10 wherein the document is one of a word processing document, a legacy system document, or a loan origination system document.

14. The system of claim 10 wherein the document is a layered XML document.

15. The system of claim 14 wherein the layered XML document is a SMART Doc.

16. The system of claim 15 wherein the SMART Doc is MISMO compliant.

17. The system of claim 10 further comprising multiple documents bundled together to form an ePackage.

18. A method for creating an executable electronic document, the electronic document able to be printed in a format that matches the format seen by a user on a computer monitor, the method comprising:
    using a print driver to transform a document into a Portable Network Graphics representation of the document suitable to be printed;
    rasterizing the Portable Network Graphics representation to create a display representation capable of being displayed on a user's computer;
    displaying the display representation sized to display on the user's computer monitor and capable of being electronically signed by an electronic signature application;
    scaling the electronic signature to match the Portable Network Graphics representation of the document;
    populating the electronic signature to the Portable Network Graphics representation of the document; and
    printing the Portable Network Graphics representation with the electronic signature.

19. The method of claim 18 wherein the display representation is also a Portable Network Graphics representation of the document.

20. The method of claim 18 wherein the document is a MISMO compliant SMART Doc.

\* \* \* \* \*